United States Patent Office 3,207,783
Patented Sept. 21, 1965

3,207,783
PURIFICATION OF SOLID ADIPIC ACID
Ralph H. Carter, Bergenfield, N.J., assignor to Halcon International, Inc., a corporation of Delaware
No Drawing. Filed Feb. 16, 1961, Ser. No. 89,643
2 Claims. (Cl. 260—537)

This application is concerned with a process for the production of pure adipic acid from adipic acid or the like acid crystals containing adhered acetic or the like acid solvent, and more particularly to the treatment thereof with water (or alcohol, ketone or ether) to displace the adhered acid and remove the water to provide purified crystals.

It is known that cyclohexanone can be catalytically oxidized by molecular oxygen to adipic acid, and the crude adipic acid can be refined by crystallization from acetic acid. However, it is extremely difficult to completely remove the acetic acid. The art is faced with the problem of providing a process for obtaining good yields of high purity adipic acid from cyclohexane oxidation products in an economically feasible manner.

The discoveries associated with the invention and relating to the solution of the above problems, and the objects achieved in accordance with the invention as set forth herein include the provision of:

A process for the purification of a solid dicarboxylic acid containing adhered mono-carboxylic acid which comprises contacting said solid with a non-carboxylated, oxygenated material boiling in the range from room temperature to a temperature only slightly above that of the carboxylic acid, the removal of which is to be effected, and driving off the adhered acid and the contacting material;

Such a process wherein the contacting material is selected from the group consisting of water, methanol, ethanol, acetone, methyl ethyl ketone and ethers containing up to 6 carbon atoms;

Such a process wherein the solid is adipic acid containing adhered acetic acid, and it is contacted with water;

Such a process wherein the amount of water is 0.05 to 1.0 times the weight of the solid;

Such a process wherein the solid to which water is applied is in the form of a cake.

In order to indicate still more fully the nature of the present invention, the following examples of typical procedures are set forth in which parts and percents mean parts and percents by weights, respectively; it being understood that these examples are presented as illustrative only and they are not intended to limit the scope of the invention.

Example 1

Cyclohexane and catalyst (such as manganese and/or cobalt napthenate) are added to a first oxidation zone maintained at 150° C. and at a pressure such as to maintain the cyclohexane in a liquid phase. Air is bubbled through the cyclohexane for about one hour at the rate of 0.7 to 1.0 s.c.f.m. Approximately 15% of the cyclohexane is converted to oil containing 34.2% cyclohexanone, 27% cyclohexanol and the remainder other oxygenated compounds. All the unreacted cyclohexane is removed from the reaction mixture by distillation and is returned to the first oxidation zone for further conversion. Of the oil so obtained, 25 parts are admixed with 75 parts acetic acid, 0.15 part manganese acetate and 0.2 part copper acetate and the mixture fed to a second reaction zone maintained at 85° to 90° C. Oxygen is passed therethrough at a rate of 1 to 2 s.c.f.m. for a period of about six hours. The reaction mixture is then cooled to 25° C. and adipic acid is crystallized and separated. The yield is 14.1 parts of crude adipic acid.

The following data shown the effect on adipic acid purity of washing with acetic acid and water as opposed to washing with acetic acid only. Washing, in both cases, is accomplished by pouring the wash solvent into the adipic acid contained in a Buchner funnel and forcing the wash solvent to flow through the cake by application of vacuum. In each case the data reported are obtained only after the solid has been dried, as completely as possible, by treatment in a hot air (110° C.) oven for as long as is required to cause it to attain constant weight.

| | Commercial adipic acid | Crude adipic acid washed with 2.0 lb. of acetic acid/lb. of adipic acid | Crude adipic acid washed with 1 lb. of acetic acid and then 1 lb. of water/lb. of adipic acid |
|---|---|---|---|
| Melting point (° C.) | 151.0–152.7 | 149.5–152.0 | 151.5–152.8 |
| Solution color, 20 g./methanol, APHA max | 6 | 50 | 30 |
| Heat color (4½ hrs. at 200° C.) Hellige varnish color scale | 3 | 7 | 5 |

A standard is used to indicate the quantity or intensity of color of the products in solution or liquid form is known as the APHA standard color test. This test is one developed by the American Public Health Association which is found on page 2048 of the 5th edition of "Standard Method of Chemical Analysis" by Wilfred W. Scott, or in A.S.T.M. Method D 1209–54.

For colored liquid which may be too dark to fit in the above mentioned scale, the standard used to indicate the quantity or intensity of color thereof is that known as the Hellige Varnish Color Comparator (1930). The method of measurement and the apparatus are described in Circular No. 605–40 of the manufacturer: Hellige Incorporated, 877 Stewart Avenue, Garden City, New York.

The above data demonstrate the improvement in adipic acid purity effected by washing with water.

Example 2

A sample of adipic acid which had been crystallized from acetic acid is dried at 120° C. for 24 hours. Upon cooling, the adipic acid still has a strong odor of acetic acid at room conditions.

Another sample of adipic acid which had been crystallized from acetic acid is simply wetted with water and dried at 100° C. for one hour. Upon cooling, there is no acetic acid odor.

It is evident from these results that contacting with water is very effective in removing all traces of acetic acid.

This invention is applicable to the purification of any dibasic acid which may be produced by crystallization from acetic acid or other lower monocarboxylic acid solution.

Instead of acetic acid, any saturated monocarboxylic acid having from 2 to 6 carbon atoms per molecule may be used as solvents. In general, a lower boiling point oxygenated material which is chemically inert in the system will act as a displacing material, including water, methanol, acetone, methyl or ethyl ether and the like. Contacting with the displacing material may be by slurrying the adipic or other solid acid with it, application of the wash solvent to an adipic acid cake on either a filter or a centrifuge by means of pouring or spraying, or recrystallization of the adipic acid from the displacing solvent.

The lower temperature limit for contacting with the wash solvent is the freezing point thereof. There is no upper amount, but a weight of wash solvent equal to 0.05 to 1.0 times the weight of adipic acid is sufficient to achieve substantially maximum purification.

The upper treating temperature is the softening point of the solid.

By means of this invention, it is possible to effect purification of adipic acid such as could otherwise be achieved only by costly recrystallizations, and to remove traces of acetic acid which cannot otherwise be eliminated.

In view of the foregoing disclosures, variations and modifications thereof will be apparent to one skilled in the art, and it is intended to include within the invention all such variations and modifications except as do not come within the scope of the appended claims.

What is claimed is:

1. A process for the purification of solid adipic acid containing adhered acetic acid which comprises contacting said solid adipic acid with a liquid selected from the group consisting of water, methanol, acetone, methyl ether, ethyl ether, ethanol and methyl ethyl ketone in amount of 0.05 to 1.0 times the weight of adipic acid at a temperature above the freezing point of said liquid and below the softening point of adipic acid, and driving off the said adhered acetic acid and said liquid from said solid adipic acid.

2. The process for the purification of solid adipic acid containing adhered acetic acid which comprises contacting said solid at a temperature between the freezing point of the contacting liquid and the softening point of the solid with liquid water in an amount by weight equal to 0.05 to 1.0 times the weight of said solid, and thereafter driving off the adhered acid and the said water from said solid adipic acid.

References Cited by the Examiner

UNITED STATES PATENTS 2,773,094    12/56    Englert et al. _____ 260—537

LORRAINE A. WEINBERGER, *Primary Examiner.*

LEON ZITVER, *Examiner.*